United States Patent
Reinecke

(10) Patent No.: US 10,409,988 B2
(45) Date of Patent: Sep. 10, 2019

(54) ESCALATED REMEDIATION

(71) Applicant: HEWLETT PACKARD ENTERPRISE DEVELOPMENT LP, Houston, TX (US)

(72) Inventor: Kate Elizabeth Reinecke, Bristol (GB)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 224 days.

(21) Appl. No.: 15/410,934

(22) Filed: Jan. 20, 2017

(65) Prior Publication Data

US 2018/0211042 A1    Jul. 26, 2018

(51) Int. Cl.
G06F 21/00 (2013.01)
G06F 21/56 (2013.01)
G06F 21/57 (2013.01)
G06F 9/455 (2018.01)

(52) U.S. Cl.
CPC .......... *G06F 21/568* (2013.01); *G06F 21/577* (2013.01); *G06F 9/45558* (2013.01); *G06F 2009/45587* (2013.01)

(58) Field of Classification Search
CPC ......... G06F 21/568; G06F 2009/45587; G06F 9/45558; G06F 21/577
See application file for complete search history.

(56) References Cited

U.S. PATENT DOCUMENTS

| 7,447,850 | B1 | 11/2008 | Del Rosso et al. |
| 7,702,868 | B1 | 4/2010 | Hardman |
| 8,666,938 | B1 | 3/2014 | Pancholy |
| 8,682,862 | B2 | 3/2014 | Rosikiewicz et al. |
| 8,826,077 | B2* | 9/2014 | Bobak ................ G06F 11/0709 714/26 |
| 9,218,254 | B2 | 12/2015 | Locasto et al. |
| 9,430,333 | B2 | 8/2016 | D'Amato et al. |
| 9,459,974 | B2 | 10/2016 | He et al. |
| 9,971,655 | B1 | 5/2018 | Li et al. |

(Continued)

OTHER PUBLICATIONS

Kevin Hooke, "Snapshot a Running Docket-Machine on VirtualBox?," Nov. 12, 2015, 1-page [online], Retrieved from the Internet on Dec. 13, 2016 at URL: <superuser.com/questions/999664/snapshot-a-running-docker-machine-on-virtualbox>.

(Continued)

*Primary Examiner* — Kendall Dolly
(74) *Attorney, Agent, or Firm* — Hewlett Packard Enterprise Patent Department

(57) ABSTRACT

Example implementations relate to escalated remediation. In an example implementation, a recovery script for addressing a security threat to the computing system may be received by a recovery service from a triggering entity. The recovery script may be processed by the recovery service to determine a security-related recovery action and a target component of the recovery action. The recovery action may be forwarded by the recovery service to a recovery agent at an abstraction layer immediately above the target component. The recovery agent may execute the recovery action on the target component. In response to a determination by the triggering entity that the recovery action did not address the security threat, the recovery service may receive a next recovery script that is more aggressive.

20 Claims, 5 Drawing Sheets

(56) References Cited

U.S. PATENT DOCUMENTS

| | | |
|---|---|---|
| 2001/0037475 A1 | 11/2001 | Bradshaw et al. |
| 2007/0250930 A1 | 10/2007 | Aziz et al. |
| 2008/0005782 A1 | 1/2008 | Aziz |
| 2008/0276123 A1 | 11/2008 | Sudhakar et al. |
| 2011/0071981 A1* | 3/2011 | Ghosh ................ G06F 11/2025 707/634 |
| 2012/0185913 A1* | 7/2012 | Martinez ................ G06F 9/455 726/1 |
| 2014/0258238 A1 | 9/2014 | Jin et al. |
| 2014/0281709 A1 | 9/2014 | D'Amato et al. |
| 2015/0163088 A1 | 6/2015 | Anschutz |
| 2016/0283281 A1 | 9/2016 | Jinto |
| 2018/0211042 A1 | 7/2018 | Reinecke et al. |

OTHER PUBLICATIONS

"Storage Integrated Data Protection," Aug. 2016, pp. 1-4, Brochure, Hewlett Packard Enterprise Development LP, Available at: <h20195. www2.hpe.com/V2/getpdf.aspx/4AA5-5173ENW.pdf?ver=Rev% 203>.

David Vossel, "Pacemaker Remote: Scaling High Availability Clusters," 2016, pp. 1-46, Edition 7, Available at: <clusterlabs.org/doc/en-US/Pacemaker/1.1-pcs/pdf/Pacemaker_Remote/Pacemaker-1.1-Pacemaker_Remote-en-US.pdf>.

Extended European Search Report, EP Application No. 18159058.9, dated Jul. 26, 2018, pp. 1-9, EPO.

* cited by examiner

ESCALATED REMEDIATION

BACKGROUND

A computing system may employ various levels and layers of abstraction. For example, a computing system may be a physical system that includes a processing resource and memory. The physical system may employ an operating system having a hypervisor installed, the hypervisor may run virtual machines, a virtual machine may have a container engine installed, and the container engine may run a number of containerized applications.

BRIEF DESCRIPTION OF THE DRAWINGS

Various examples will be described below with reference to the following figures.

DETAILED DESCRIPTION

As described above, a computing system may employ various layers of abstraction. These layers may be interacting and interdependent, and also host components (e.g., processor-executed programs and software) of the computing system. For example, a computing system may be a physical system having processing resource(s) and memory. The physical system may employ an operating system having a hypervisor installed, the hypervisor may run a virtual machine (VM), the VM may have a container engine installed, and the container engine may run a containerized application. In such an example, the operating system, the VM, the container, and the application may each be abstraction layers. Other types of abstraction layers not described above also may be employed. Various example computing systems may employ different numbers or combinations of such abstraction layers.

However, a computing system and any or all of the abstraction layers may be subject to security threats, such as malware. Threat detection systems, whether deployed on, by, or external to the computing system, may be useful for detecting such security threats. In response to detection of a security threat, the computing system or the threat detection system may attempt to recover or restore the computing system to a known good state. Some recovery processes may have negative effects such as undesirably long system downtime and unavailability.

Accordingly, it may be useful to recover a computing system in a manner that balances effectiveness of recovery, time to recover, system availability, and other metrics. Examples disclosed herein may relate to, among other things, receiving, by a recovery service and from a triggering entity, a recovery script from a set of recovery scripts for addressing a security threat to the computing system; processing, by the recovery service, the recovery script to determine a security-related recovery action and a target component of the recovery action; forwarding, by the recovery service, the recovery action to a recovery agent at an abstraction layer of the computing system immediately above the target component; executing the recovery action by the recovery agent on the target component; and receiving, by the recovery service, a next recovery script of the set of recovery scripts that is more aggressive than the recovery script upon determination by the triggering entity that the recovery action did not address the security threat.

By virtue of having a set of recovery scripts of varying system impact and/or effectiveness, remediation of a security threat on the computing system may be performed in an escalating manner that attempts lower impact recovery scripts first and then increasingly aggressive scripts of greater effectiveness but potentially greater negative system impact until the security threat is resolved or the recovery scripts are exhausted.

Figure 1:
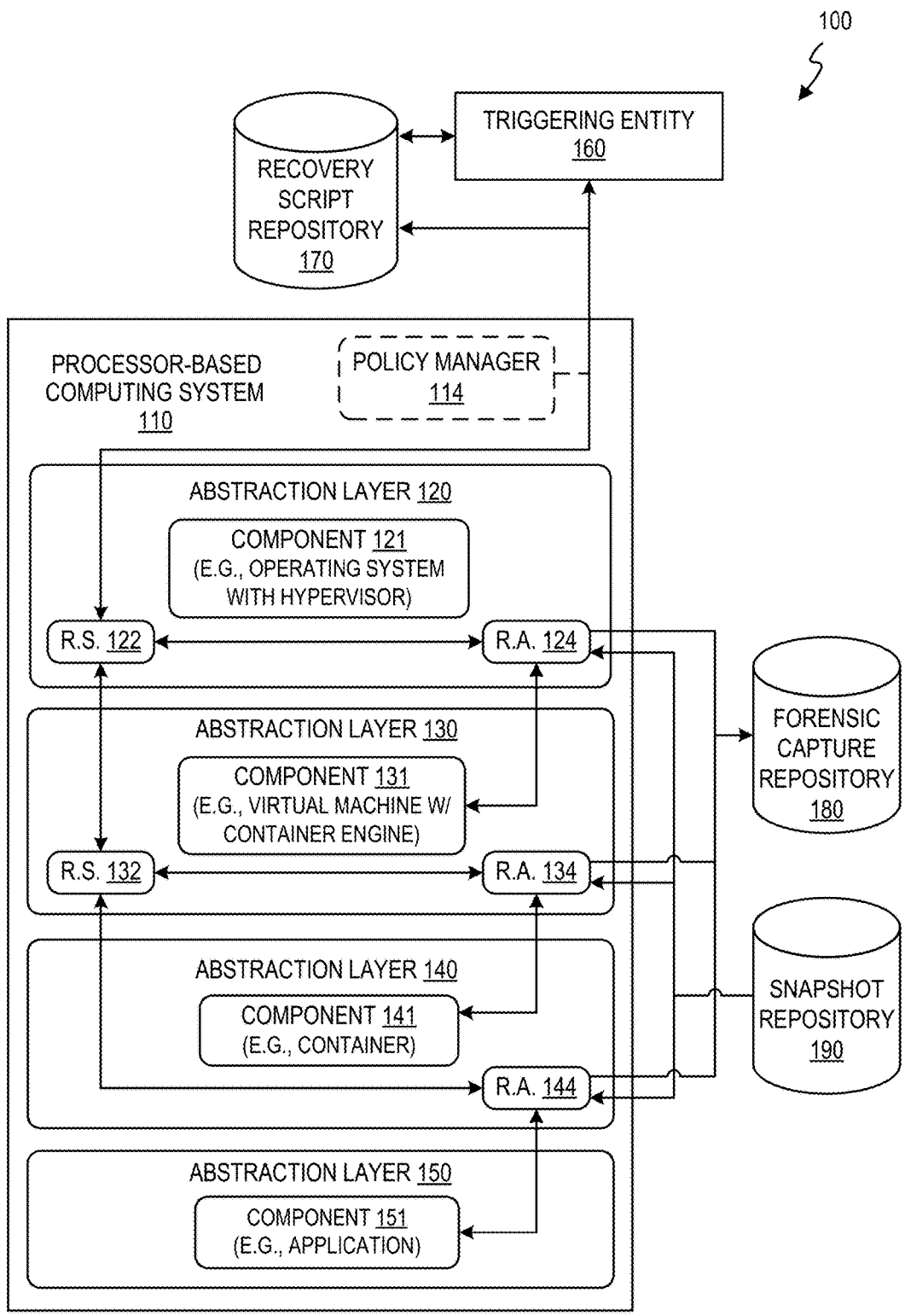
FIG. 1 is a block diagram depicting an example environment that may employ escalated remediation at a computing system.

Referring now to the figures, FIG. 1 is a block diagram depicting an example environment 100 that may employ escalated remediation at a processor-based computing system 110. The computing system 110 may employ hardware devices (e.g., electronic circuitry or logic) or any combination of hardware and programming to implement various functionalities described herein. For example, programming may include executable instructions stored on a non-transitory machine readable medium, such as random access memory (RAM), read-only memory (ROM), electrically erasable programmable read-only memory (EEPROM), flash memory, a hard disk drive, etc. Hardware may include a processing resource, such as a microcontroller, a microprocessor, central processing unit (CPU) core(s), an application-specific integrated circuit (ASIC), a field programmable gate array (FPGA), and/or other hardware device suitable for retrieval and/or execution of instructions from the machine readable medium.

The environment 100 also may include a triggering entity 160. The triggering entity 160 may be a hardware device or a combination of hardware and programming, such as a computer. More particularly, in some examples, the triggering entity 160 may be a threat detection system that, using hardware or a combination of hardware and programming, monitors and detects security threats and attacks on the computing system 110, monitors and analyzes network traffic (e.g., DNS traffic) related to the computing system 110, monitors kernel integrity of the computing system 110, performs other security threat monitoring, or any combination of the foregoing. In some examples, the triggering entity 160 may be a rejuvenation system that, using hardware or a combination of hardware and programming, refreshes components of the computing system 110 at scheduled times (e.g., by restarting, rebooting, or killing and recreating those components) to preempt security issues.

The triggering entity 160 may be implemented external to the computing system 110 and in communication with the computing system 110 via any wired and/or wireless communication technology or network (e.g., Ethernet, Universal Serial Bus or USB, optical fiber, Wi-Fi®, Bluetooth®, etc.). In some cases, the triggering entity 160 may be implemented by or on the computing system 110 itself.

The environment 100 also may include a recovery script repository 170, a forensic capture repository 180, and a snapshot repository 190. The repositories 170, 180, 190 may each include a persistent storage device, such as a solid state drive, a hard disk drive, a tape drive, persistent memory, or a device based on other storage medium, for storage of data. The recovery script repository 170 may store recovery scripts that include recovery action(s) or a sequence thereof. Recovery scripts and recovery actions will be described further herein below. The forensic capture repository 180 may receive and store capture data about the components (e.g., 121, 131, 141, 151 to be described below) of the computing system 110, such as disk images, memory snapshots, or application configuration files. The snapshot repository 190 may store snapshots, images, files, or the like, of components (e.g., 121, 131, 141, 151) of the computing system 110 when in a known good state.

The computing system 110, using hardware or a combination of hardware and programming included therein, may establish a plurality of abstraction layers (e.g., 120, 130, 140, 150) and a component (e.g., 121, 131, 141, 151) operating at some or each of the abstraction layers. For example, as illustrated in the example of FIG. 1, the computing system 110 may have an abstraction layer 120 that is the physical hardware (also referred to as the physical layer) that includes an operating system component 121 with a type-2 hypervisor installed thereon. The hypervisor may in turn create, run, and manage a VM that is a component 131 at an abstraction layer 130 (also referred to as the virtual layer). The VM of abstraction layer 130 may have a container engine installed thereon, and the container engine may create, run, and manage a container component 141 at an abstraction layer 140 (also referred to as the container layer). The container (component 141) may hold an application (also referred to as a containerized application) and a related runtime environment, and the application may be deemed a component 151 at an abstraction layer 150 (also referred to as the application layer). The abstraction layers and components depicted in FIG. 1 are an example, and other numbers or combinations of abstraction layers and components may be employed in other examples. For example, a hypervisor may run and manage a plurality of VMs, and a container engine of the VM may run multiple containers.

The abstraction layers 120, 130, 140, 150 may be deemed hierarchical, by virtue of management relationships. For example in that abstraction layer 120 is higher than abstraction layer 130 by virtue of the hypervisor at layer 120 managing the VM (131) of layer 130. Additionally, abstraction layer 130 is higher than abstraction layer 140 by virtue of the container engine on the VM (131) at layer 130 managing the container (141) of layer 140. Additionally, abstraction layer 140 is higher than abstraction layer 150 by virtue of the container (141) holding the application (151) of layer 150. Abstraction layer 150 may be deemed the lowest level in the example of FIG. 1.

The computing system 110, using hardware or a combination of hardware and programming included therein, may deploy one or more recovery services (abbreviated R.S. in FIG. 1) and one or more recovery agents (abbreviated R.A. in FIG. 1). In some implementations, a recovery service and a recovery agent are deployed to at least some abstraction layers, that is, the recovery service and recovery agent may be run by or executed at those abstraction layers. In some implementations, a component may run or execute a recovery service or recovery agent for that abstraction layer; for example, the operating system component 121 may run the recovery service 122 or recovery agent 124 at abstraction layer 120.

The recovery services and recovery agents taken collectively may be understood to form, at least in part, an architecture for recovering virtualized or containerized computing systems. As will be described, recovery services operate as orchestrators by forwarding recovery scripts or actions and recovery agents operate as implementers of recovery actions.

A recovery agent includes an interface to receive recovery action instructions from a recovery service at the same abstraction layer or from a recovery service at a higher abstraction layer. The recovery agent executes received recovery action instructions by acting directly or indirectly on a component at a next lower abstraction layer relative to the recovery agent. For example, the recovery agent may interact with a management component at the abstraction layer in which the recovery agent resides to act on a component at the next lower abstraction layer which is managed by that management component, as will be illustrated in examples below. In other words, the recovery agent for a particular component may reside at an abstraction layer immediately above that component. In some examples, the lowest abstraction layer of a computing system may not have a recovery agent and/or recovery service, as there is not a next lower abstraction layer to act on.

A recovery service may have an interface to receive or retrieve recovery scripts and to forward recovery scripts or actions. For example, the recovery service 122 may retrieve or receive (via the triggering entity 160) a recovery script from the recovery script repository 170. A recovery service may process a recovery script to determine a recovery action or sequence of recovery actions included in the script. As part of that determination, a recovery service may also determine the target component of the recovery action(s), particularly where a computing system has multiple layers and/or multiple components per layer. The recovery service then forwards the recovery script, recovery action, or sequence of recovery actions eventually to a recovery agent that is able to act on the target component. In some instances, a recovery service may forward the recovery script to another recovery service at a lower abstraction layer to reach the appropriate recovery agent able to act on the target component. In other instances, the triggering entity may pass a recovery script directly to the recovery service at the appropriate layer by bypassing intermediary recovery services. In some examples, a recovery service may also receive feedback from a recovery agent indicating the outcome of executing the recovery action(s) (e.g., indications of success or failure, quantitative parameters, etc.), and may pass the feedback up to the triggering entity 160.

For example, FIG. 1 depicts a recovery service 122 (also referred to as a physical host recovery service) and recovery agent 124 (also referred to as a physical host recovery agent) at the abstraction layer 120, a recovery service 132 (also referred to as a virtual machine recovery service) and a recovery agent 134 (also referred to as a virtual machine recovery agent) at the abstraction layer 130, and a recovery agent 144 (also referred to as a container recovery agent) at the abstraction layer 140. The recovery agent 124 may interface with the hypervisor of operating system component 121 at layer 120 to perform recovery actions on the VM component 131 at the next lower layer 130. The recovery agent 134 may interface with the container engine of the VM component 131 at layer 130 to perform recovery actions on the container component 141 at the next lower layer 140. The recovery agent 144 may directly perform recovery actions on the application component 151 at the next lower layer 150, using application-specific handlers for example. In the example of FIG. 1, there is no finer level of granularity below the application layer 150 and thus no orchestration for which a recovery service would be deployed at the application layer 150—the recovery service 132 at the virtual layer 130 may forward recovery actions directly to the recovery agent 144.

As described above, the recovery script repository 170 may store a plurality of recovery scripts, each including a recovery action or a sequence of recovery actions to be performed by a recovery agent. An example recovery action may include restoring at least a part of a targeted component at a targeted abstraction layer to a previous image to a previous known good state (e.g., by replacing, restoring, or rolling back the component using a snapshot, an image, a file, a configuration, etc. from the snapshot repository 190). Another example recovery action may include monitoring a targeted component for further analysis. Another example recovery action may include performing a forensic capture (e.g., capturing a filesystem snapshot, a memory snapshot, configuration parameters, etc.) of the targeted component and sending the captured data to the forensic capture repository 180.

For a given security threat to computing system 110, a set of recovery scripts may be generated that aim to remediate the security threat at a different cost-effectiveness balance. Differently balanced scripts may be generated using, for example, rule-based or model-based analytics with consideration for metrics about recovery timing of different recovery actions, frequency of system or component compromise or corruption, and other variables. In other words, one recovery script may attempt to remediate a given security threat with low negative impact to the computing system 110 (e.g., low downtime) but potentially lower effectiveness or probability of full remediation, while a different recovery script may attempt to remediate the same security threat with greater negative impact to the computing system 110 (e.g., longer downtime) but potentially greater effectiveness or probability of full remediation. In some instances, a recovery action that acts at a lower abstraction layer may have lesser negative impact on the computing system 110 than a recovery action that acts at a higher abstraction layer, because the higher abstraction layer may have a greater number of dependent components and the like that may be disrupted by the recovery action.

Accordingly, the recovery script repository may store a set of recovery scripts having differing degrees of trade-off between system disruptiveness and effectiveness at addressing a particular security threat to the computing system 110. Generation of the scripts may be performed manually by a user and/or in an automated manner by a computer, and using stochastic modeling for example of input metrics and variables.

Remediation of a security threat on the computing system 110 may be performed in an escalating manner that attempts lower impact recovery scripts first and then increasingly aggressive scripts of greater effectiveness but potentially greater negative system impact until the security threat is resolved or the recovery scripts are exhausted. In some implementations, a more aggressive recovery script includes a recovery action that is performed on a next higher abstraction layer than a previously performed recovery script for the security threat.

An illustration of escalated remediation in operation on the computing system 110 will now be described. The triggering entity 160 may monitor the computing system 110 for security threats. Upon detection of a security threat, the triggering entity 160 may select a set of recovery scripts that correspond to the detected security threat and pass a first recovery script with least negative impact on the computing system 110 to the recovery service 122.

In some implementations, the computing system 110 has a policy manager 114 implemented as hardware or a combination of hardware and programming. The policy manager 114 may receive an indication of a detected security threat from the triggering entity 160, and in lieu of the triggering entity 160, the policy manager 114 may retrieve the set of recovery scripts for addressing the security threat, and select the first recovery script from the set of recovery scripts to pass to the recovery service 122.

In the present illustration, presume the detected security threat is corruption or compromise of a containerized application (e.g., 151). Accordingly, the first recovery script may include an action that targets the abstraction layer 150, and more particularly, the application component 151 or a closely related runtime environment.

The recovery service 122 may determine that the recovery action in the script targets the application component 151 and thus passes the recovery script to recovery service 132, which in turn processes the recovery script and passes the individual recovery action(s) to the recovery agent 144 at the container layer and in the container for execution. For example, the recovery agent 144 may, according to the recovery action, utilize application specific handlers on the application component 151. As an illustration, if the containerized application component 151 is a web-application, the application specific handler may activate a native recovery facility of the application component 151 that reverts loaded modules to a default list of official plug-ins and unloads third-party modules. The recovery agent 144 may then send a recovery action completion notification to the triggering entity 160, via the recovery services 132, 122 for example.

If the triggering entity 160 no longer detects the security threat, then remediation is deemed complete. However, if the security threat is still detected, then remediation is escalated, and the triggering entity 160 (or the policy manager 114) selects from the set of recovery scripts a next recovery script that is more aggressive than the previous recovery script that did not address the security threat. For example, the next and more aggressive recovery script may be passed down to the recovery service 132 at the abstraction layer 130 (virtual layer), and the recovery service 132 may process the script to extract a recovery action that the recovery agent 134 performs on the container component 141. As an illustration, the recovery agent 134 may cooperate with the container engine in the VM component 131 via the container engine's application programming interface (API) to perform a container rollback on the container component 141 to a known good image selected from the snapshot recovery 190. Rolling back the container may be slightly more disruptive than the application module recovery described above, because container rollback may cause the web-application (151) to become unavailable until the container component 141 is restarted. The recovery agent 134 notifies the triggering entity 160 when rollback is complete (e.g., via recovery services 132, 122).

Again, if the triggering entity 160 no longer detects the security threat, then remediation is deemed complete. However, if the security threat is still detected, then remediation is escalated again, and the triggering entity 160 (or the policy manager 114) sends the next and more aggressive recovery script from the set of recovery scripts to the recovery service 122 (physical layer). In this iteration, the recovery service 122 may process the script to extract a recovery action that the recovery agent 124 performs on the VM component 131. As an illustration, the recovery agent 124 may interact directly with the hypervisor running on the operating system component 121 via the hypervisor's API to rollback the VM component 131 to a known good image from the snapshot recovery 190. Rolling back the VM may be yet more disruptive than container rollback as described above, as the web-application and possibly other components will be unavailable until the VM is restarted and a VM restart may take more time than a container restart. The recovery agent 124 may notify the triggering entity 160 when rollback is complete (e.g., via recovery service 122).

If the triggering entity 160 does not detect the security threat, then remediation is deemed complete. However, if the security threat is still detected and the set of recovery scripts has been exhausted, then the triggering entity 160 or the policy manager 114 may enact a fail-safe shut down of the computing system 110. In this manner, an irremediable computing system can be isolated to prevent further damage by the security threat.

In addition to or as an alternative to the rollback-type actions described above, recovery actions may involve forensic capture at various abstraction layers. Escalated remediation of forensic capture may mean that a more aggressive recovery script includes a broader scope forensic capture than a previously received and performed recovery script for the same or similar security threat. Broader scope forensic capture may mean forensic capture at a higher abstraction layer or of a larger memory space. For example, forensic capture may initially include a memory snapshot of an application component 151, and a more aggressive forensic capture may include a memory snapshot of the virtual machine component 131.

In some implementations, where the triggering entity 160 is a rejuvenation system, recovery scripts may refresh at least part of the abstraction layers. Escalated remediation may thus involve, for example, refreshing progressively higher abstraction layers.

In some implementations, the integrity of the recovery services 122, 132 and/or the recovery agents 124, 134, 144 may be tested. For example, the triggering entity 160 may test the integrity of the recovery services and/or agents prior to passing a recovery script from the recovery script repository 170 to the recovery services and agents. In other examples, the activity of recovery services and/or agents may be monitored during execution of a recovery script and deviations from expected behavior or unresponsiveness of a recovery service or agent may indicate an integrity failure. If an integrity failure of a recovery service or agent is detected, that recovery service or agent may be refreshed, using a golden image in the snapshot repository 190 for example.

In some implementations, the set of recovery scripts may be modified or adjusted based on recovery agent feedback from previous executions of the recovery scripts. For example, a recovery agent may report an elapsed time to perform a particular recovery action, and a user or a computer may adjust the cost-effectiveness balance of the corresponding recovery script using new elapsed time data. In this manner, the escalation order of recovery scripts within a set may change, for example. Other reportable data that may impact cost-effectiveness balances and the escalation order of recovery scripts includes failure/success rates of a recovery action, occurrence frequency of a type of security threat, a count of dependencies affected by a recovery action, and other metrics.

Figure 2:
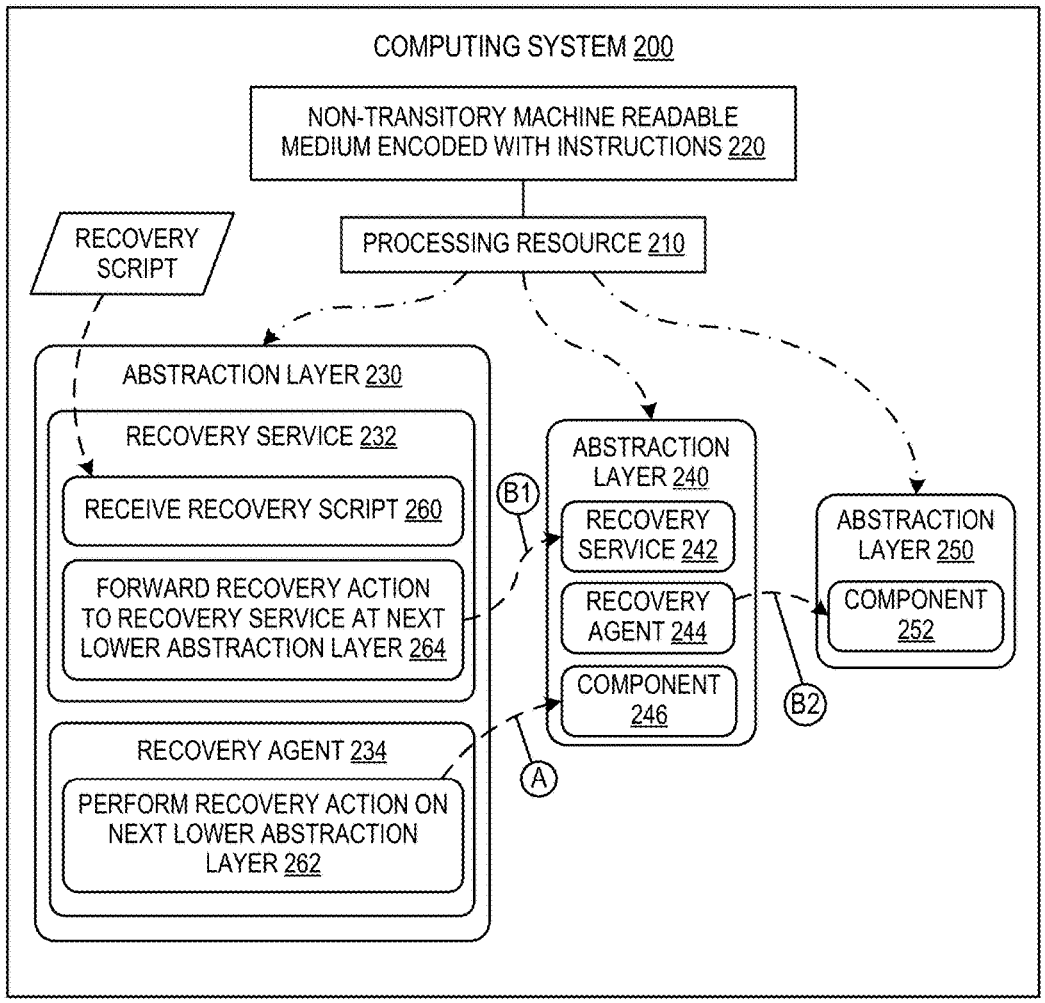
FIG. 2 is a block diagram depicting an example computing system that employs escalated remediation.

FIG. 2 is a block diagram depicting an example computing system 200 that employs escalated remediation. The system 200 includes a processing resource 210 and a non-transitory machine readable medium 220. The processing resource 210 may be a hardware processing resource, such as a microcontroller, a microprocessor, CPU core(s), an ASIC, an FPGA, and/or other hardware device suitable for retrieval and/or execution of instructions from the machine readable medium 220. The machine readable medium 220 may include RAM, ROM, EEPROM, flash memory, a hard disk drive, or the like.

The medium 220 stores instructions that, when executed by the processing resource 210, cause the processing resource 210 to perform the functionality described below. The processing resource 210 may execute instructions to establish abstraction layers on the computing system 200, as denoted by the dot-dash lines in FIG. 2. For example, abstraction layers 230, 240, and 250 are depicted in FIG. 2, although more or fewer abstraction layers may be established on other example computing systems. In some implementations, at least some of the abstraction layers 230, 240, 250 may be analogous in many respects to at least some of the abstraction layers 120, 130, 140, 150 of FIG. 1. The abstraction layers 230, 240, 250 may be hierarchical, that is, layer 250 is lower than layer 240 and layer 240 is lower than layer 230.

The processing resource 210 also may execute instructions to deploy a recovery service to at least one abstraction layer. For example, a recovery service 232 may be deployed to the abstraction layer 230, and a recovery service 242 may be deployed to the abstraction layer 242. Such recovery service(s) may be analogous in many respects to the recovery services described above with respect to FIG. 1. The processing resource 210 also may execute instructions to deploy a recovery agent to at least one abstraction layer. For example, a recovery agent 234 may be deployed to the abstraction layer 230 and a recovery agent 244 may be deployed to abstraction layer 240. Such recovery agent(s) may be analogous in many respects to the recovery agents described above with respect to FIG. 1.

The processing resource 210 may execute instructions to receive, at a recovery service 232 of a particular abstraction layer 230, a recovery script to address a security threat to the computing system 200. The processing resource 210 executes instructions to perform (262) by a recovery agent 234 the recovery action (depicted as encircled "A" on FIG. 2) on a component 246 at the next lower abstraction layer 240, if the recovery action ("A") included in the recovery script targets the next lower abstraction layer 240 relative to the particular abstraction layer 230.

The processing resource 210 may execute instructions to forward (264), via the recovery service 232, the recovery script (depicted as encircled "B1" on FIG. 2) to another recovery service 242 at the next lower abstraction layer 240 for execution (depicted as "B2" on FIG. 2) on a component 252 at the abstraction layer 250 lower than the next lower abstraction layer 240, if the recovery script includes a recovery action ("B2") targeting the abstraction layer 250 lower than the next lower abstraction layer 240.

The processing resource 210 may execute instructions to receive (260), by the recovery service 232 at the particular abstraction layer 230, a more aggressive recovery script for escalated remediation upon determination that the recovery action (e.g., A or B2) did not address the security threat. In this manner, the computing system 200 may employ progressively more aggressive recovery scripts until the security threat is resolved or available recovery scripts are exhausted, where a more aggressive recovery script may have a higher probability of remediating the security threat at the cost of greater system impact (e.g., downtime, unavailability, etc.) relative to a less aggressive recovery script.

Figure 3:
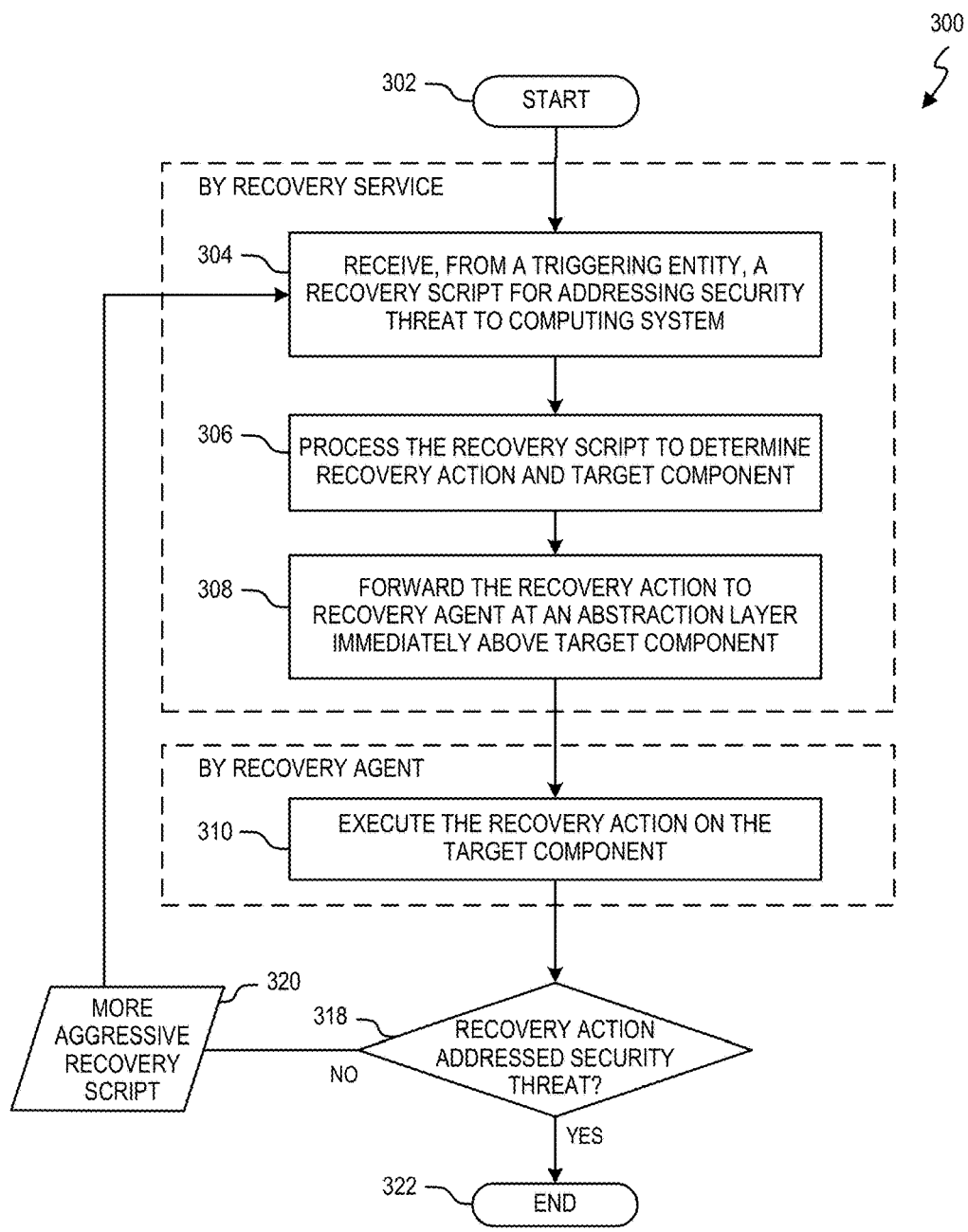
FIG. 3 is a flow diagram depicting an example method for escalated remediation.

FIG. 3 is a flow diagram depicting an example method 300 for escalated remediation of a processor-based computing system (e.g., 110 or 200) having multiple abstraction layers. Method 300 may be implemented in the form of executable instructions stored on a machine readable medium and executed by a processing resource (e.g., a microcontroller, a microprocessor, central processing unit core(s), an ASIC, an FPGA, etc.) and/or in the form of electronic circuitry. For example, method 300 may be described below for illustrative purposes as being performed by a recovery service and a recovery agent implemented as hardware or a combination of hardware and programming, such as the recovery service 122 or 132 and the recovery agent 124, 134, or 144 of the processor-based computing system 110 described above, although at least portions of the method 300 may also be performed by other recovery services or recovery agents, such as those of the computing system 200 described above.

In some implementations, one or more blocks of method 300 may be executed substantially concurrently or in a different order than shown in FIG. 3. In some implementations, method 300 may include more or fewer blocks than are shown in FIG. 3. In some implementations, one or more of the blocks of method 300 may, at certain times, be ongoing and/or may repeat.

Method 300 may begin at block 302 and continue to block 304, where a recovery service (e.g., 122) receives, from a triggering entity (e.g., 160), a recovery script or a set of recovery scripts for addressing a security threat to the computing system (e.g., 110). In some implementations, the triggering entity may be a security threat detection system. In other implementations, the triggering entity may be a rejuvenation system to refresh at least part of the abstraction layers, in which case the "detected security threat" is a potential or future security threat and the recovery script is intended to preempt a potential or future security threat.

At block 306, the recovery service (e.g., 122) processes the recovery script to determine a security-related recovery action (or sequence of actions) and a target component (e.g. 151 in one example iteration of method 300) of the recovery action. An example recovery action may be a component restart, a rollback of a component to a known good image, a forensic capture, a monitoring action without a remedial action, or other actions such as those described above with respect to FIG. 1.

At block 308, the recovery service (e.g., 122) forwards the recovery action to a recovery agent (e.g., 124) at an abstraction layer of the computing system immediately above the target component (e.g., layer 140 above component 151 in an illustration). Forwarding may involve passing the recovery script down through recovery services and/or agents of intermediate abstraction layers. At block 310, the recovery agent executes the recovery action on the target component (e.g., 151).

At block 318, it may be determined whether the recovery action addressed the security threat. For example, in some implementations, the triggering entity (e.g., 160) may make the determination at block 318. If the recovery action did not address the security threat ("NO" at block 318), a recovery service (e.g., 122) receives a next recovery script 320 from the set of recovery scripts that is more aggressive than the recovery script received, processed, and executed in a previous iteration of method 300, and the method 300 returns to block 304. For example, the more aggressive script may target a component of a higher abstraction layer (e.g., component 141 at layer 140). In some implementations, the triggering entity (e.g., 160) may select the more aggressive recovery script 320 to be received at block 304. The method 300 then proceeds to perform blocks 306, 308, and 310 using the more aggressive recovery script. Referring again to block 318, if the recovery action has been addressed ("YES" at block 318), method 300 may proceed to end at block 322.

Figure 4:
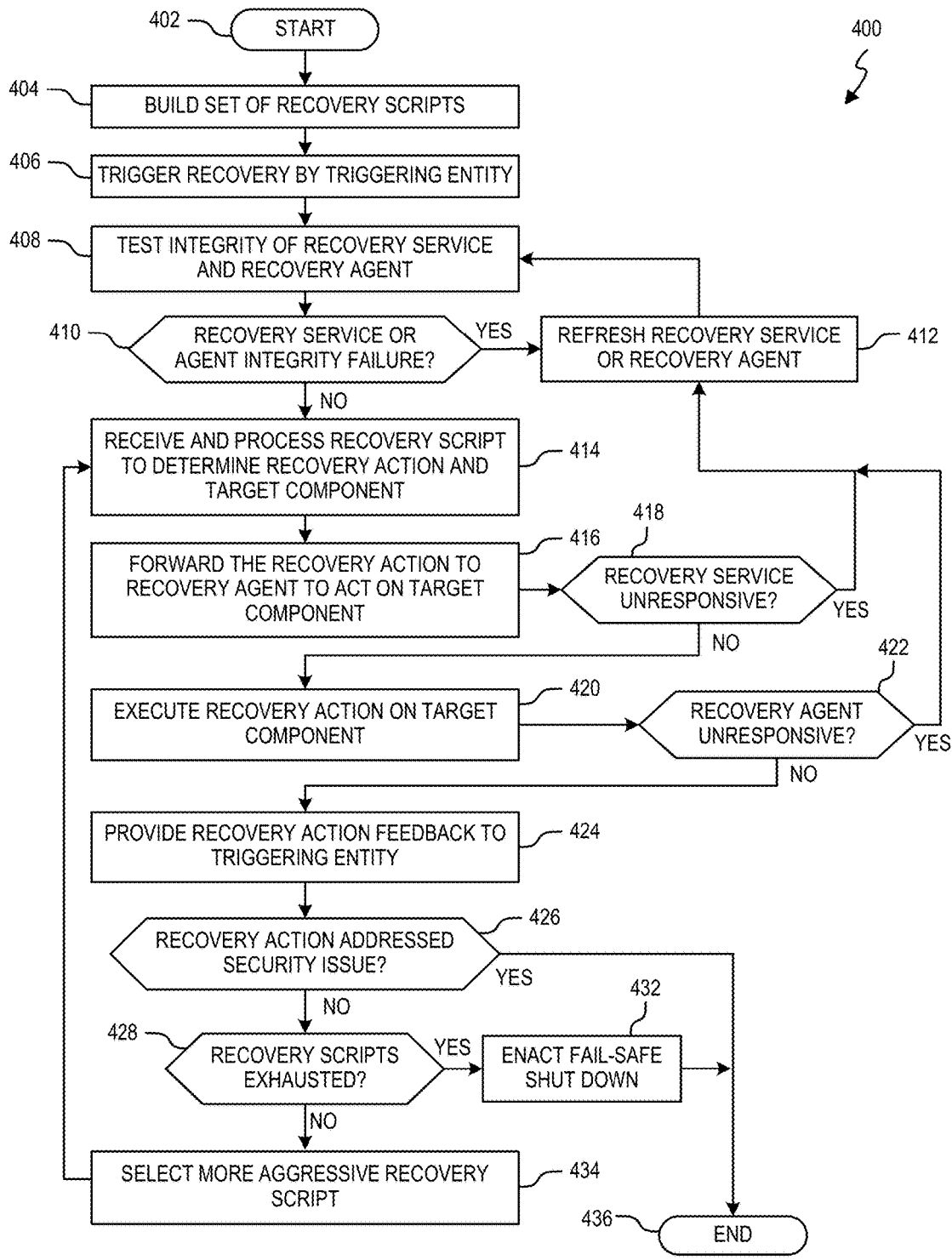
FIG. 4 is a flow diagram depicting another example method for escalated remediation.

FIG. 4 is a flow diagram depicting an example method 400 for escalated remediation according to another implementation. As with method 300, method 400 may be implemented in the form of executable instructions stored on a machine readable medium and executed by a processing resource and/or in the form of electronic circuitry, and more particularly, may be described below for illustrative purposes as being performed by a recovery service and a recovery agent implemented as hardware or a combination of hardware and programming, such as the recovery service 122 or 132 and the recovery agent 124, 134, or 144 of the processor-based computing system 110 described above, although at least portions of the method 400 may also be performed by other recovery services or recovery agents, such as those of the computing system 200 described above.

In some implementations, one or more blocks of method 400 may be executed substantially concurrently or in a different order than shown in FIG. 4, method 400 may include more or fewer blocks than are shown in FIG. 4, and one or more of the blocks of method 400 may be ongoing and/or may repeat.

Method 400 may begin at block 402 and continue to block 404, where a plurality set of recovery scripts having differing degrees of trade-off between disruptiveness to the computing system and effectiveness at addressing a security threat is built. Generation of the scripts may be performed manually by a user, in a semi-automated manner (i.e., manually with computer guidance), and/or in a fully automated manner by a computer. Differently balanced scripts may be generated and ordered for escalation in a set of scripts by, for example, rule-based or model-based analytics using stochastic modeling of inputs such as metrics about recovery timing of different recovery actions, frequency of system or component compromise or corruption, and other variables. Such inputs may be feedback from a previous iteration of method 400 in some implementations.

At block 406, a triggering entity (e.g., 160) triggers or starts recovery for a computing system (e.g., 110). For example, the triggering entity may trigger recovery in response to a detected security threat or to preempt a future security threat (e.g., where the triggering entity is a rejuvenation system). Block 406 may be analogous to block 304 described above, in many respects.

At block 408, the integrity of the recovery service(s) and recovery agent(s) of the computing system may be tested, by the triggering entity or a higher level recovery service or agent. Integrity may be tested by observing for malicious signatures, verifying signatures, comparing expected to actual results, behavior analysis, and other techniques.

If a recovery service or agent integrity failure is detected ("YES" at block 410), method 400 proceeds to block 412, where the failed recovery service or agent is refreshed. For example, the refresh may be performed by the triggering entity or a higher level recovery service or agent. A refresh may include rolling back to a known good image or golden image of the failed recovery service or agent.

If no recovery service or agent integrity failure is detected ("NO" at block 410), method 400 proceeds to block 414, where a recovery service (e.g., 122) receives and processes a recovery script to determine a recovery action and a target component (e.g., 151). Block 414 may be analogous in many respects to block 304 and 306 described above, in many respects.

At block 416, the recovery service forwards the recovery action to a recovery agent (e.g., 144) that can act on the target component, which may include forwarding the recovery script through to another recovery service (e.g., 132) that may reach that target recovery agent. Block 416 may be analogous in many respects to block 308, described above. If a recovery service that is supposed to forward the recovery action is unresponsive or otherwise exhibiting unexpected behavior ("YES" at block 418), then method 400 may return to block 412 to refresh the unresponsive recovery service. If the recovery service is responsive and successfully forwards the recovery action (or script) ("NO" at block 418), then method 400 proceeds to block 420.

At block 420, the recovery agent that can act on the target component executes the recovery action on the target component. Block 420 may be analogous in many respects to block 310 described above. If the recovery agent is unresponsive or otherwise exhibiting unexpected behavior ("YES" at block 422), then method 400 may return to block 412 to refresh the unresponsive recovery agent. If the recovery agent is responsive and executes the recovery action ("NO" at block 422), then method 400 proceeds to block 424, where the recovery agent provides feedback about execution of the recovery action to the triggering entity. Feedback may be passed via recovery services of the computing system. Some of the feedback may be useful for adjusting the set of recovery scripts in real-time or in a subsequent iteration of the method 400 (e.g., by execution of block 404).

At block 426, the triggering entity determines whether the security threat has been addressed or is unaddressed. For example, the triggering entity may determine whether security threat symptoms (e.g., a particular type of network traffic, kernel integrity check results, scheduled rejuvenation, etc.) have been resolved. If the security threat has been addressed ("YES" at block 426), method 400 proceeds to end at block 436.

If the security threat is unaddressed ("NO" at block 426), the triggering entity determines whether the set of recovery scripts has been exhausted, that is, all recovery scripts for the security threat have been tried. If the recovery scripts have been exhausted ("YES" at block 428), method 400 proceeds to block 432, where the computing system undergoes a fail-safe shut down to isolate the computing system. The shut down may be initiated or requested by the triggering system.

If the recovery scripts have not been exhausted ("NO" at block 428), method 400 proceeds to block 434, where the triggering entity selects a more aggressive recovery script or the next most aggressive recovery script from the set of recovery scripts in order to escalate remediation. Method 400 then returns to 414, where the triggering entity provides the more aggressive or next most aggressive recovery script selected at block 434 to a recovery service to perform another attempt at remediating the security threat. Accordingly, by virtue of the foregoing method, remediation of a security threat on the computing system may be performed in an escalating manner that attempts lower impact recovery scripts first and then increasingly aggressive scripts of greater effectiveness but potentially greater negative system impact until the security threat is resolved or the recovery scripts are exhausted.

Figure 5:
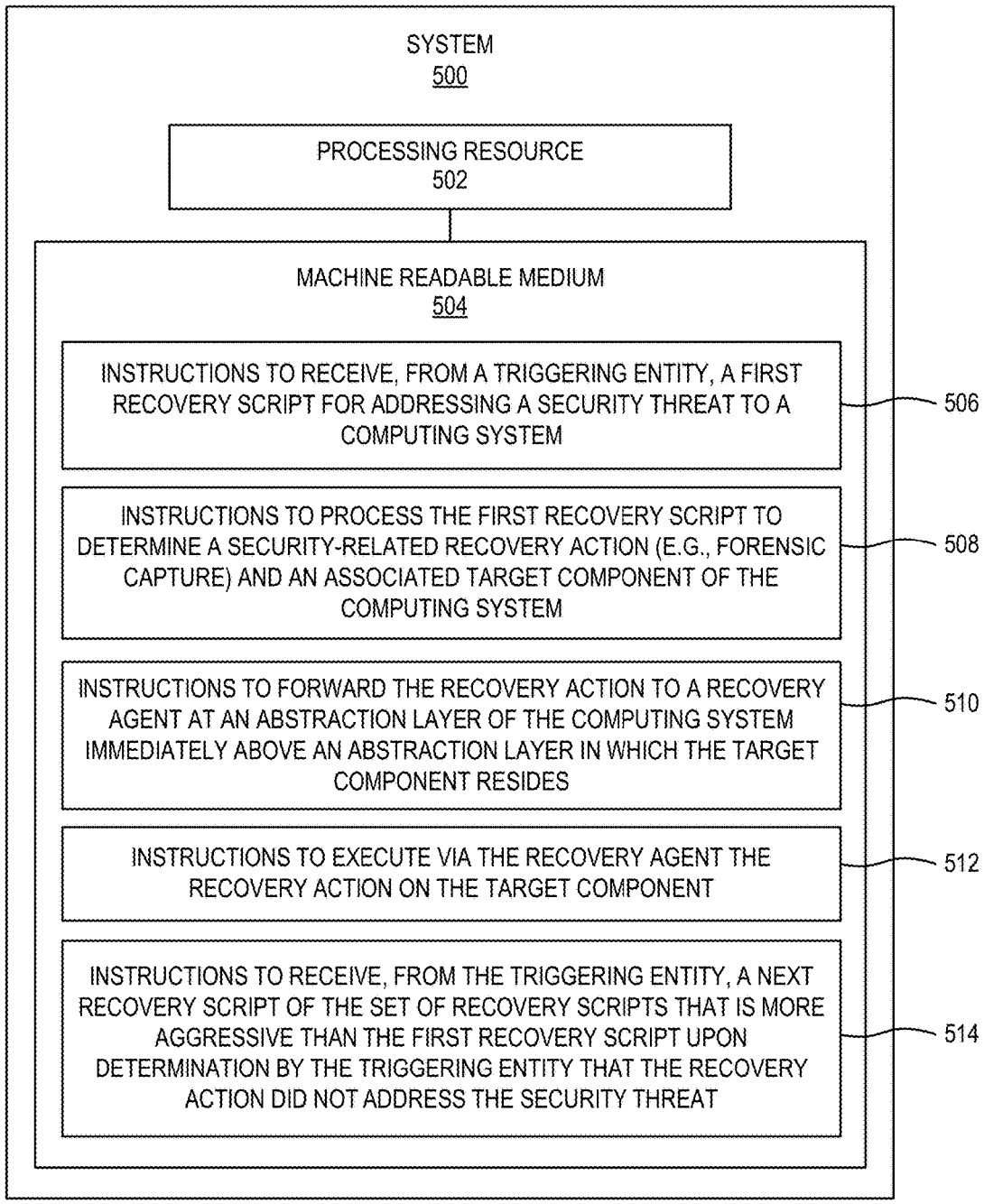
FIG. 5 is a block diagram of an example system that includes a non-transitory, machine readable medium encoded with example instructions for escalated remediation.

FIG. 5 is a block diagram of an example system 500 that includes a processing resource 502 coupled to a non-transitory, machine readable medium 504 encoded with example instructions. The processing resource 502 may include a microcontroller, a microprocessor, central processing unit core(s), an ASIC, an FPGA, and/or other hardware device suitable for retrieval and/or execution of instructions from the machine readable medium 504 to perform functions related to various examples. Additionally or alternatively, the processing resource 502 may include electronic circuitry for performing the functionality of the instructions described herein.

The machine readable medium 504 may be any medium suitable for storing executable instructions, such as RAM, ROM, EEPROM, flash memory, a hard disk drive, an optical disc, or the like. In some example implementations, the machine readable medium 504 may be a tangible, non-transitory medium, where the term "non-transitory" does not encompass transitory propagating signals. The machine readable medium 504 may be disposed within the system 500, as shown in FIG. 5, in which case the executable instructions may be deemed "installed" or "embedded" on the system 500. Alternatively, the machine readable medium 504 may be a portable (e.g., external) storage medium, and may be part of an "installation package." The instructions stored on the machine readable medium 504 may be useful for implementing recovery service(s) or recovery agent(s) of FIG. 1 or 2, as well as at least portions of method 300 of FIG. 3 or method 400 of FIG. 4.

As described further herein below, the machine readable medium 504 may be encoded with a set of executable instructions 506, 508, 510, 512, 514. It should be understood that part or all of the executable instructions and/or electronic circuits included within one box may, in alternate implementations, be included in a different box shown in the figures or in a different box not shown. Some implementations of the system 500 may include more or fewer instructions than are shown in FIG. 5.

Instructions 506, upon execution, may cause the processing resource 502 to receive, from a triggering entity, a first recovery script from a set of recovery scripts for addressing a security threat to a computing system. The computing system may be, in part or in whole, the system 500.

Instructions 508, upon execution, may cause the processing resource 502 to process the first recovery script to determine a security-related recovery action and an associated target component of the computing system. Instructions 510, upon execution, may cause the processing resource 502 to forward the recovery action to a recovery agent at an abstraction layer of the computing system immediately above an abstraction layer in which the target component resides.

Instructions 512, upon execution, may cause the processing resource 502 to execute via the recovery agent the recovery action on the target component. Instructions 514, upon execution, may cause the processing resource 502 to receive, from the triggering entity, a next recovery script of the set of recovery scripts that is more aggressive than the first recovery script upon determination by the triggering entity that the recovery action did not address the security threat.

In some implementations, the remediation performed by instructions 506, 508, 510, 512, 514 may be related to forensic capture. For example, in some cases, the root cause of a security threat may not be known, and thus further observation and analysis may be useful before a executing a system-altering recovery action, such as component rollback or refresh. By leveraging instructions 506, 508, 510, 512, 514, forensic capture also may be carried out in an escalated manner—for example, the recovery action of the first recovery script may include a forensic capture of the target component, and the next recovery script may include a recovery action that is a broader scope forensic capture than the forensic capture of the first recovery script (e.g., capturing the abstraction layer above the target component).

In other examples, the machine readable medium 504 may be encoded with other instructions (not shown) useful for implementing other features of recovery service(s) or recovery agent(s) of FIG. 1 or 2, method 300 of FIG. 3, or method 400 of FIG. 4. For example, the medium 504 may be encoded with instructions to monitor the integrity of the recovery service and the recovery agent, and to refresh the recovery service or the recovery agent upon detection of an integrity failure of the recovery service or the recovery agent, respectively. In another example, the medium 504 may be encoded with instructions to pass feedback about execution of the recovery action to the triggering entity. In some implementations, the medium 504 may be encoded with instructions to enact a fail-safe shut down of the computing system in response to a determination by the triggering entity that the security threat is unaddressed and the set of recovery scripts have been exhausted.

In the foregoing description, numerous details are set forth to provide an understanding of the subject matter disclosed herein. However, implementation may be practiced without some or all of these details. Other implementations may include modifications and variations from the details discussed above. It is intended that the following claims cover such modifications and variations.

What is claimed:

1. A computing system comprising:
  a processing resource; and
  a non-transitory machine readable medium encoded with instructions that, when executed, cause the processing resource to:
    establish hierarchical abstraction layers on the computing system, the abstraction layers including a virtual layer and a container layer, and a component of a lower one of the abstraction layers being managed at a next higher one of the abstraction layers,
    receive, at a recovery service of a particular abstraction layer of the abstraction layers, a recovery script to address a security threat to the computing system,
    determine if the recovery script targets a next lower abstraction layer relative to the particular abstraction layer or an abstraction layer lower than the next lower abstraction layer,
    if the recovery script includes a recovery action targeting the next lower abstraction layer, perform by a recovery agent the recovery action on a component at the next lower abstraction layer,
    if the recovery script includes a recovery action targeting the abstraction layer lower than the next lower abstraction layer, forwarding by the recovery service the recovery script to the next lower abstraction layer for execution on a component at the abstraction layer lower than the next lower abstraction layer, and
    receive by the recovery service at the particular abstraction layer, a next recovery script for escalated remediation upon determination that the recovery action did not address the security threat, the next recovery script causing higher downtime and having higher probability of fully remediating the security threat compared to the recovery script.

2. The computing system of claim 1, wherein:
  the multiple abstraction layers include, in hierarchical order:
    a physical layer that includes an operating system with a hypervisor installed,
    the virtual layer, which includes a virtual machine managed by the hypervisor, the virtual machine having a container engine installed,
    the container layer, which includes a container managed by the container engine, and
    an application layer, which includes an application held in the container,
  the physical layer includes a physical host recovery service and a physical host recovery agent to perform recovery actions on the virtual machine by interfacing with hypervisor,
  the virtual layer includes a virtual machine recovery service and a virtual machine recovery agent to perform recovery actions on the container by interfacing with the container engine, and
  the container layer includes a container recovery agent to perform recovery actions on the application.

3. The computing system of claim 1, further comprising a recovery script repository that stores a set of recovery scripts, including a first script that causes higher downtime and has higher probability of fully remediating the security threat to the computing system compared to a second script.

4. The computing system of claim 1, wherein the recovery action includes restoring at least a part of a component at a targeted abstraction layer using a snapshot, image, file, or configuration associated with a previous state of the computing system.

5. The computing system of claim 1, wherein the next recovery script includes a recovery action to be performed on a next higher abstraction layer than a previously received recovery script for the security threat.

6. The computing system of claim 1, wherein the next recovery script includes a forensic capture of a higher abstraction layer or of a larger memory space than a previously received recovery script for the security threat.

7. The computing system of claim 3, wherein the non-transitory machine readable medium is further encoded with instructions that, when executed, cause the processing resource to:
  receive an indication of the security threat from a triggering entity,
  select the recovery script from the set of recovery scripts,
  pass the recovery script to the recovery service of the particular abstraction layer,
  determine that the security threat has not been addressed after the recovery script has been fully executed,
  select the next recovery script from the set of recovery scripts, and
  pass the next aggressive recovery script to the recovery service.

8. A method for escalated remediation by a processor-based computing system, the method comprising:
  receiving, by a recovery service executing on a processing resource and from a triggering entity, a recovery script for addressing a security threat to the computing system having multiple hierarchically-managed abstraction layers;
  processing, by the recovery service, the recovery script to determine a security-related recovery action and a target component of the recovery action;
  forwarding, by the recovery service, the recovery action to a recovery agent at a first abstraction layer immediately above a second abstraction layer hosting the target component, wherein the first abstraction layer includes a management component for managing the target component;

executing the recovery action by the recovery agent on the target component via the management component; and receiving, by the recovery service, a next recovery script upon determination by the triggering entity that the recovery action did not address the security threat, the next recovery script causing higher downtime and having higher probability of remediating the security threat compared to the recovery script.

9. The method of claim 8, wherein the triggering entity is a security threat detection system.

10. The method of claim 8, wherein the triggering entity is a rejuvenation system to refresh at least part of the hierarchically-managed abstraction layers.

11. The method of claim 8, further comprising enacting a fail-safe shut down of the computing system upon a determination by the triggering entity that the security threat is unaddressed and recovery scripts have been exhausted.

12. The method of claim 8, further comprising building a set of recovery scripts, including a first script that causes higher downtime and has higher probability of fully remediating the security threat than a second script.

13. The method of claim 8, further comprising:
testing integrity of the recovery service and the recovery agent; and
refreshing the recovery service or the recovery agent if an integrity failure is detected.

14. The method of claim 8, wherein the recovery action includes monitoring without a remedial action.

15. A non-transitory machine readable medium comprising instructions that, when executed by a processing resource, cause the processing resource to:
receive, from a triggering entity, a first recovery script from a set of recovery scripts for addressing a security threat to a computing system having multiple hierarchically-managed abstraction layers;
process the first recovery script to determine a security-related recovery action and an associated target component of the computing system;
forward the recovery action to a recovery agent at a first abstraction layer of the computing system immediately above a second abstraction layer in which the target component resides;
execute via the recovery agent the recovery action on the target component; and
receive, from the triggering entity, a next recovery script of the set of recovery scripts upon determination by the triggering entity that the recovery action did not address the security threat,
wherein the recovery action of the first recovery script includes a forensic capture of the target component, and
the next recovery script includes a recovery action that includes a forensic capture of a higher abstraction layer or of a lamer memory space than the forensic capture of the first recovery script.

16. The non-transitory machine readable medium of claim 15, further comprising instructions that, when executed, cause the processing resource to pass feedback about execution of the recovery action to the triggering entity.

17. The non-transitory machine readable medium of claim 15, further comprising instructions that, when executed, cause the processing resource to enact a fail-safe shut down of the computing system in response to a determination by the triggering entity that the security threat is unaddressed and the set of recovery scripts have been exhausted.

18. The non-transitory machine readable medium of claim 15, further comprising instructions that, when executed, cause the processing resource to:
monitor the integrity of the recovery service and the recovery agent; and
refresh the recovery service or the recovery agent upon detection of an integrity failure of the recovery service or the recovery agent, respectively.

19. The non-transitory machine readable medium of claim 15, wherein
the target component is a containerized application, and
the second abstraction layer is a container layer.

20. The non-transitory machine readable medium of claim 19, wherein the next recovery script includes a target component that is a container at the container layer that holds the containerized application and includes a recovery action to be executed at a virtual layer immediately above the container layer by a recovery agent at the virtual layer in cooperation with a container engine in a virtual machine at the virtual layer.

* * * * *